July 18, 1972 D. LE COQ 3,677,833
CAMERA TUBE TARGETS
Original Filed June 22, 1967
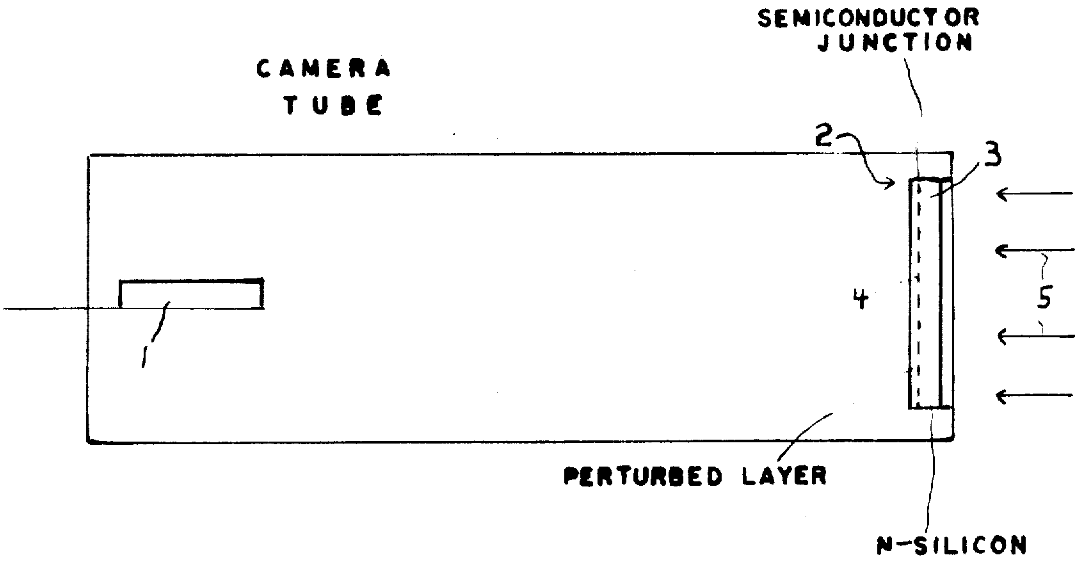
INVENTOR.
DANIEL LE COQ
BY
AGENT

United States Patent Office 3,677,833
Patented July 18, 1972

3,677,833
CAMERA TUBE TARGETS

Daniel Le Coq, Rueil-Malmaison, France, assignor to North American Philips Company Inc., New York, N.Y.

Continuation of application Ser. No. 647,959, June 22, 1967. This application Dec. 9, 1969, Ser. No. 880,473
Int. Cl. H01j *29/45, 31/38*
U.S. Cl. 148—33.2 5 Claims

ABSTRACT OF THE DISCLOSURE

A photosensitive target for a camera tube comprising a slice of n-type silicon having adjacent one face a shallow junction produced by creating voids in the crystal lattice. This may be accomplished by polishing with a fine abrasive, or by bombardment with subatomic particles.

This application is a continuation of application Ser. No. 647,959, filed June 22, 1967, now abandoned.

The invention relates to mosaics of junctions in semiconductor bodies and to a method of manufacturing these mosaics. Semiconductor bodies containing such a mosaic are used inter alia in camera tubes in which the phenomenon is utilised in which a charge pattern is built up on irradiation of junctions which operate as photodiodes. According to known methods mosaics of junctions are produced by deposition of a doping element on a semiconductor substrate from the vapour phase with the aid of a metal mask and subsequent alloying of the said element to the substrate. The disadvantage due to a low space factor of the mosaic are known. The space factor is limited by the dimensions of the mask.

The method according to the invention is simple, since it requires no thermal treatment.

According to the invention a method of manufacturing a mosaic of semiconductor junctions in a single-crystal n-type semiconductor body is characterized in that the semiconductor junction is produced by creating voids in the crystal lattice at one surface of the semiconductor body.

It is known that lattice defects occur in most solids and that they influence certain mechanical and plastic properties. In the semiconductor bodies these lattice defects may give rise to considerable modification of the electrical properties.

Thus voids, that is to say lattice defects obtained by withdrawing atoms from the crystal, may behave as acceptors.

In the crystals in which the interaction between the atoms is of the covalent type, as is the case in semiconductor bodies such silicon, germanium and silicon carbide, a stable bond is obtained by linking pairs of electrons with opposite orbital moments. If an atom is withdrawn from the crystal, the internal energy of the crystal increases and near the void one or more unsaturated bonds are produced. Hence the void behaves as an acceptor. A void in a crystal of, for example, silicon or germanium is surrounded by four valence electrons belonging to neighboring atoms which in the presence of the missing atom produce the bond with this atom. It may be assumed that the void may contain four electrons so that the outermost electron shells of the adjacent atoms are completed but the mutual electrostatic repulsion of these electrons would then give rise to a very great energy. If the dielectric constant of the semiconductor is allowed for, one or two electrons may be bound in energy levels situated in the forbidden band.

It will be seen that a void can behave as an acceptor, as is borne out by experience.

The method according to the invention will now be described; it should be noted that this method is particularly suitable if a mosaic of junctions in a semiconductor is to be produced in which a high sheet resistance in the transverse direction is desirable, as is the case in devices in which the phenomenon is utilised in which a charge pattern is built up on irradiation of junctions which operate as photodiodes and in which a lateral flowing off of the stored charges is undesirable.

The starting material which forms the substrate of the mosaic is a single-crystal slice of n-type silicon (resistivity 2 to 3 ohm cm.) of 2 mm. thickness. The slice has been etched so that the surface layer which includes imperfections is entirely removed from the crystal. For this purpose an etchant is used of the following composition:

| | Parts |
|---|---|
| Nitric acid ($HNO_3$) | 2 |
| Hydrofluoric acid (HF) | 1 |
| Acetic acid ($CH_3COOH$) | 1 |

This treatment enables a very thin perturbed layer of a few A. thickness to be subsequently obtained by polishing.

This perturbed layer is produced by polishing the disc with a diamond paste with a grain size of 0.25 micron. The duration of this treatment varies from a few seconds to about 15 minutes. The thickness of the layer is controlled by testing the mosaic in a demountable tube, the optimum thickness of the perturbed layer being obtained when the sensitivity is a maximum.

The accompanying drawing is a schematic view of a camera tube having at one end conventional scanning means 1 and at the opposite end a semiconductor target 2 of an n-type silicon substrate 3 having the perturbed layer 4 on the surface. The target 2 is irradiated by radiation from an object indicated by the arrows 5.

The embodiment described of the method according to the invention is given by way of example only and obviously many modifications or variations are possible without departing from the scope of the invention. For example, the perturbed layer may alternatively be obtained by bombarding the crystal with particles of suitable energy.

What is claimed is:

1. A camera tube comprising a radiation-responsive semiconductor wafer-shaped target body adapted on irradiation to build up a charge pattern, said target body comprising a single crystal of n-type conductivity material having adjacent one face, and spaced inward therefrom of the order of an angstrom, a semiconductor junction produced by creating voids in the crystal lattice of the body at said one face, said one face having a high resistance in the direction along the face such that said electrical junction behaves as a mosaic of semiconductor junctions.

2. A tube as set forth in claim 1 wherein the body is a slice of single crystal silicon.

3. A tube as set forth in claim 2 wherein the voids are produced by polishing said one face with a fine abrasive.

4. A tube as set forth in claim 2 wherein the voids are produced by bombardment with subatomic particles.

5. A tube as set forth in claim 1 wherein the voids exist in a layer of the target body of a few angstroms in thickness.

References Cited

UNITED STATES PATENTS

| | | | |
|---|---|---|---|
| 2,402,839 | 6/1946 | Ohl | 148—1.5 X |
| 2,577,803 | 12/1951 | Pfann | 148—1.5 X |
| 3,289,024 | 11/1966 | De Haan et al. | 313—65 AB |
| 3,409,797 | 11/1968 | Ross | 315—10 |
| 2,911,539 | 11/1959 | Tanenbaum | 148—33.2 X |
| 3,206,336 | 9/1965 | Hora | 148—1.5 |

L. DEWAYNE RUTLEDGE, Primary Examiner

E. L. WEISE, Assistant Examiner

U.S. Cl. X.R.

313—65 AB; 317—235 N